United States Patent
Kim et al.

(10) Patent No.: US 9,954,242 B2
(45) Date of Patent: Apr. 24, 2018

(54) MEMBRANE-ELECTRODE ASSEMBLY WITH A PROTECTIVE LAYER, AND FUEL CELL STACK AND FABRICATING METHOD OF MEMBRANE-ELECTRODE ASSEMBLY

(75) Inventors: Hee-Tak Kim, Yongin-si (KR);
Sung-Yong Cho, Yongin-si (KR);
Tae-Yoon Kim, Yongin-si (KR);
Kah-Young Song, Yongin-si (KR);
Sang-Il Han, Yongin-si (KR);
Geun-Seok Chai, Yongin-si (KR);
Myoung-Ki Min, Yongin-si (KR)

(73) Assignee: Kolon Industries, Inc., Gwacheon-si (KR)

( * ) Notice: Subject to any disclaimer, the term of this patent is extended or adjusted under 35 U.S.C. 154(b) by 530 days.

(21) Appl. No.: 13/048,821

(22) Filed: Mar. 15, 2011

(65) Prior Publication Data
US 2012/0021325 A1 Jan. 26, 2012

(30) Foreign Application Priority Data

Jul. 22, 2010 (KR) .................... 10-2010-0071086

(51) Int. Cl.
*H01M 8/12* (2016.01)
*H01M 8/1213* (2016.01)
*H01M 8/1018* (2016.01)

(52) U.S. Cl.
CPC .. *H01M 8/1213* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 8,084,165 B2 | 12/2011 | Kusakabe et al. | |
| 2003/0157397 A1* | 8/2003 | Barton | H01M 4/8605 429/481 |
| 2005/0271929 A1* | 12/2005 | Sompalli et al. | 429/40 |
| 2006/0115710 A1* | 6/2006 | Kusakabe et al. | 429/44 |
| 2007/0184326 A1* | 8/2007 | Sompalli et al. | 429/35 |
| 2009/0208805 A1 | 8/2009 | Wakabayashi et al. | |

(Continued)

FOREIGN PATENT DOCUMENTS

| | | |
|---|---|---|
| JP | 2006-286430 | 10/2006 |
| JP | 2006-310288 | 11/2006 |

(Continued)

OTHER PUBLICATIONS

KIPO Office action dated Apr. 9, 2012, for Korean priority Patent application 10-2010-0071086, (5pages).

(Continued)

*Primary Examiner* — Ula C Ruddock
*Assistant Examiner* — Tony S Chuo
(74) *Attorney, Agent, or Firm* — Lewis Roca Rothgerber Christie LLP

(57) ABSTRACT

A membrane-electrode assembly for a fuel cell, the membrane-electrode assembly including an electrolyte membrane; an edge protective layer located at generally an edge of the electrolyte membrane; and a catalytic layer including a plate portion contacting the electrolyte membrane and a protruding portion protruding from the plate portion and contacting the edge protective layer.

14 Claims, 10 Drawing Sheets

(56) References Cited

U.S. PATENT DOCUMENTS

| | | | |
|---|---|---|---|
| 2009/0220841 A1* | 9/2009 | Oh | H01M 4/8605 |
| | | | 429/481 |
| 2010/0190089 A1* | 7/2010 | Akiyama | 429/492 |
| 2010/0196774 A1* | 8/2010 | Kawabata | H01M 8/0247 |
| | | | 429/437 |
| 2010/0216048 A1* | 8/2010 | Braeuninger | H01M 4/881 |
| | | | 429/483 |

FOREIGN PATENT DOCUMENTS

| | | |
|---|---|---|
| JP | 2006-338936 | 12/2006 |
| JP | 2006-338939 | 12/2006 |
| JP | 2006-338942 | 12/2006 |
| JP | 2007-035459 | 2/2007 |
| JP | 2007-066766 | 3/2007 |
| JP | 2007-141674 | 6/2007 |
| JP | 2007-149454 | 6/2007 |
| JP | 2007-180031 | 7/2007 |
| JP | 2007-214101 | 8/2007 |
| JP | 2009-193860 | 8/2009 |
| JP | 2010-129247 | 6/2010 |

OTHER PUBLICATIONS

Patent Abstracts of Japan, and English machine translation of Japanese Publication 2010-129247, (13 pages).

* cited by examiner

MEMBRANE-ELECTRODE ASSEMBLY WITH A PROTECTIVE LAYER, AND FUEL CELL STACK AND FABRICATING METHOD OF MEMBRANE-ELECTRODE ASSEMBLY

CROSS-REFERENCE TO RELATED APPLICATION

This application claims priority to and the benefit of Korean Patent Application No. 10-2010-0071086 filed in the Korean Intellectual Property Office on Jul. 22, 2010, the entire contents of which are incorporated herein by reference.

BACKGROUND (a) Field

The present invention relates to a fuel cell stack, a membrane-electrode assembly, and a fabricating method of a membrane-electrode assembly.

(b) Description of the Related Art

As known, a fuel cell is configured as an electronic generator system that converts chemical reaction energy of hydrogen contained in hydrocarbonaceous fuel with separately supplied oxygen into electrical energy.

The fuel cell may be largely classified into polymer electrolyte membrane fuel cell and direct oxidation fuel cell.

The polymer electrolyte membrane fuel cell is typically configured as a fuel cell main body called a stack and is configured to have a structure that generates electrical energy by an electrochemical reaction of hydrogen supplied from a reformer with oxygen supplied by the operation of an air pump or a fan.

Unlike a polymer electrolyte membrane fuel cell, a direct oxidation fuel cell is configured to have a structure that directly receives fuel without using hydrogen and generates electrical energy by electrochemical reaction hydrogen contained in the fuel with separately supplied oxygen.

In the above-mentioned fuel cell, the stack is configured by stacking a unit cell including a plurality of membrane-electrode assemblies (MEA) and separators.

The membrane-electrode assembly includes a polymer electrolyte membrane, a pair of catalytic layers located on both sides of the polymer electrolyte membrane, and a gas diffusion layer formed on the catalytic layer. In addition, edge protective layers are located at the edges of the polymer electrolyte membrane, wherein the edge protective layers are located at the outside of the catalytic layers.

When the gas diffusion layer directly contacts the polymer electrolyte member due to a gap generated between the edge protective layer and the catalytic layer, the edge portion of the gas diffusion layer protrudes into the polymer electrolyte membrane. Deterioration may occur at this portion such that pin-holes can be generated in the electrolyte membrane. In addition, gas transmits at a portion where the gas diffusion layer directly contacts the polymer electrolyte membrane, such that the pin-holes may occur in the electrolyte membrane by hydration (—OH) radical generated by the combination of hydrogen and oxygen. For this reason, when the pin holes are generated in the polymer electrolyte membrane, the performance of the fuel cell can be suddenly deteriorated and power generation may cease during the operation of the fuel cell.

The above information disclosed in this Background section is only for enhancement of understanding of the background of the invention and therefore it may contain information that does not form the prior art that is already known in this country to a person of ordinary skill in the art.

SUMMARY

The present invention provides an membrane-electrode assembly with improved lifespan by preventing or reducing the deterioration of an electrolyte membrane and a fuel cell stack.

According to one embodiment, a membrane-electrode assembly for a fuel cell is provided, the membrane-electrode assembly including an electrolyte membrane; an edge protective layer located at generally an edge of the electrolyte membrane; and a catalytic layer including a plate portion contacting the electrolyte membrane and a protruding portion protruding from the plate portion and contacting the edge protective layer.

In one embodiment, the protruding portion extends along an edge of the plate portion, and a thickness of the catalytic layer is less than a thickness of the edge protective layer. Further, the membrane-electrode assembly may include a gas diffusion layer on the catalytic layer. In one embodiment, the protruding portion has a guide portion tapering towards the edge protective layer. Additionally, an opening may be adjacent to the edge protective layer and a width of the catalytic layer may be greater than a width of the opening.

In another embodiment, a fuel cell stack is provided including a plurality of unit cells each comprising a membrane-electrode assembly and a pair of separators, one of the pair of separators on respective opposing sides of the membrane-electrode assembly, wherein the membrane-electrode assembly includes an electrolyte membrane; an edge protective layer located at an edge of the electrolyte membrane; and a catalytic layer including a plate portion contacting the electrolyte membrane and a protruding portion protruding from the plate portion and contacting the edge protective layer; and a pair of pressing plates, one of the pair of pressing plates on respective opposing ends of the unit cells.

In one embodiment, an opening is adjacent to the edge protective layer, and the gas diffusion layer is wider than the opening so that a portion of the gas diffusion layer is on the edge protective layer.

In yet another embodiment, a method for fabricating a membrane-electrode assembly is provided, the method including attaching an edge protective layer to an electrolyte membrane; forming a catalytic layer including a plate portion contacting the electrolyte membrane and a protruding portion protruding from the plate portion and contacting the edge protective layer; and forming a gas diffusion layer on the catalytic layer.

In one embodiment, attaching the edge protective layer includes extending the edge protective layer onto the electrolyte membrane in a rolling manner such that a plurality of openings are provided on the edge protective layer. Additionally, forming the catalytic layer may include attaching a masking film on the edge protective layer and coating a side of the electrolyte membrane and the edge protective layer with the catalytic layer. Forming the catalytic layer may further include inserting the catalytic layer attached to an insert film into an opening formed in the edge protective layer together with the insert film, pressing the catalytic layer and the insert film to attach the catalytic layer to the surface of the electrolyte membrane and to a side of the edge protective layer; and removing the insert film from the catalytic layer. Additionally, inserting the catalyzing layer may include forming the catalytic layer to be greater than a width of the opening and less than a sum of the width of the opening and a height of the side of the edge protective layer.

In one embodiment, forming the gas diffusion layer includes cutting the edge protective layer and the electrolyte membrane to separate the electrolyte membrane and attaching a gas diffusion layer onto the catalytic layer, wherein the gas diffusion layer comprises a microporous layer and a backing layer.

According to the exemplary embodiments of the present invention, because the protrusion contacts the inner side of the edge protective layer to prevent the gas diffusion layer from directly contacting the polymer electrolyte membrane, it is possible to prevent pin holes from being generated in the polymer electrolyte membrane.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
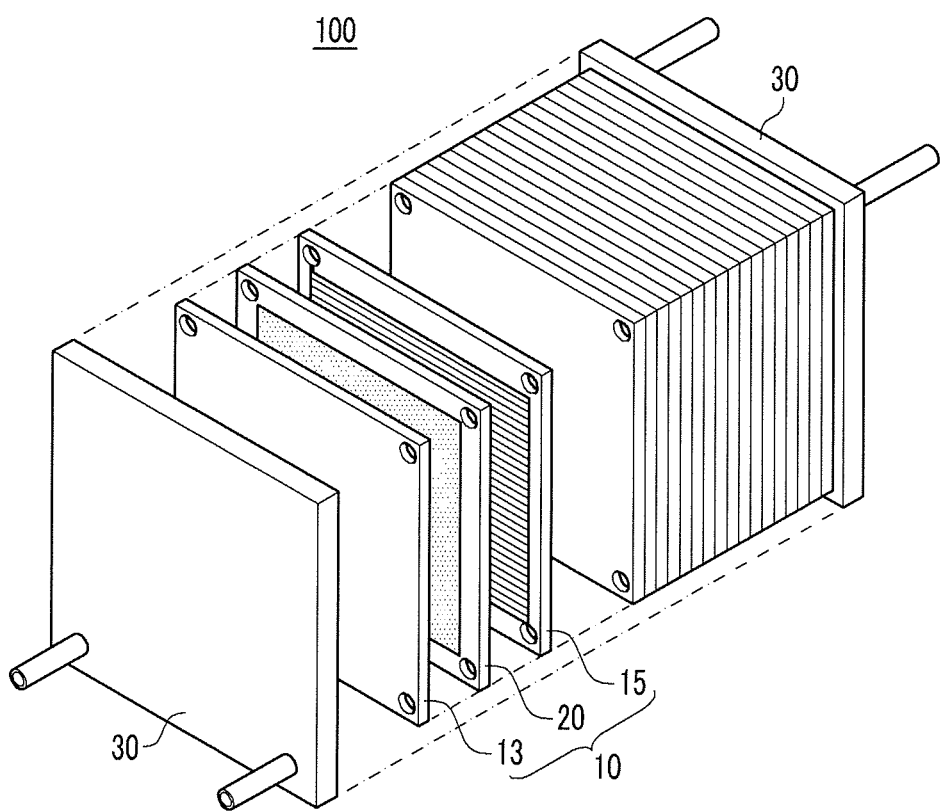
FIG. 1 is a partially exploded perspective view showing a fuel cell stack according to a first exemplary embodiment of the present invention.
Figure 2:
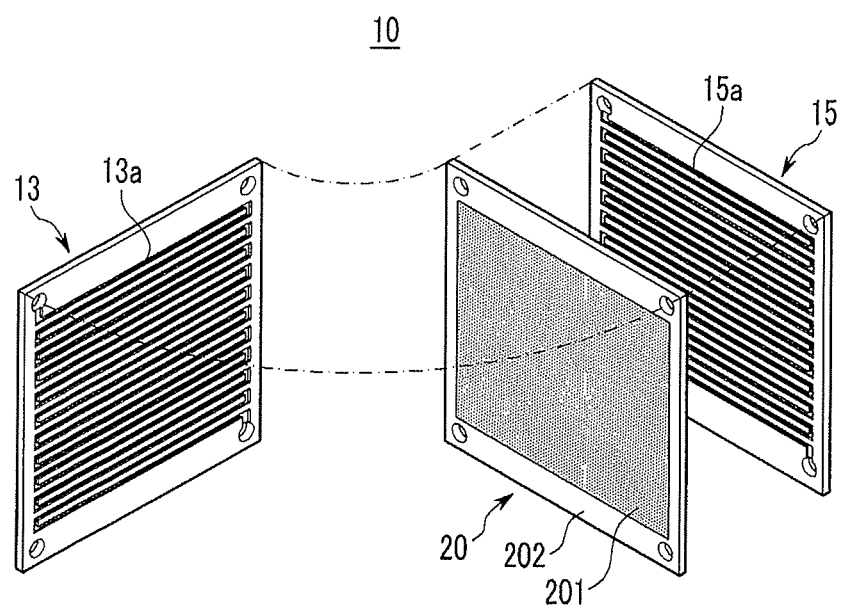
FIG. 2 is an exploded perspective view showing a unit cell according to the first exemplary embodiment of the present invention.

FIG. 1 is an exploded perspective view showing a fuel cell stack according to a first exemplary embodiment of the present invention and FIG. 2 is an exploded perspective view showing a unit cell according to the first exemplary embodiment of the present invention.

Referring to FIGS. 1 and 2, a fuel cell stack 100 according to a first exemplary embodiment is configured to include a plurality of unit cells 10 generating electric energy by electrochemically reacting fuel and oxygen.

The fuel cell stack 100 having an assembly structure of the unit cell 100 may be formed by including a plurality of unit cells 10 and consecutively stacking these unit cells 10.

The fuel used for the fuel cell stack 100 may include hydrogen containing liquid or gas fuel such as methanol, ethanol, liquefied petroleum gas (LPG), liquefied natural gas (LNG), gasoline, butane gas, etc. In one embodiment, the fuel cell stack 100 according to the present invention may use cracked hydrogen or pure hydrogen from liquid or gas fuel through a general reformer as fuel. In one embodiment, the fuel cell stack 100 may be configured as a polymer electrode membrane fuel cell type generating electric energy by the reaction of hydrogen and oxygen by the unit cell 10.

Alternatively, the fuel cell stack 100 according to an exemplary embodiment of the present invention may be configured as a direct oxidation fuel cell type generating electric energy by directly reacting liquid or gas fuel by the unit cell 10.

The fuel cell stack 100 according to an exemplary embodiment of the present invention may use pure oxygen stored in a separate storage unit as oxygen reacting with fuel and may use oxygen containing air as it is.

In the above-mentioned fuel cell stack 100, the unit cells 10 are formed by closely locating separators 13 and 15 on both sides thereof based on a membrane-electrode assembly 20 and the unit cells 10 are provided in plurality to form the fuel cell stack 100 having the stacked structure as in the exemplary embodiment.

A pressing plate 30 closely attached to the plurality of unit cells 10 may be located at one or both ends of the stack of units cells. However, the present invention is not limited thereto and the pressing plate 30 may be omitted from the fuel cell stack 100 with the separators 13 and 15 on the outermost of the plurality of unit cells 10 configured to replace the pressing plate.

The separators 13 and 15 are located close to each other with the membrane-electrode assembly 20 therebetween to form a hydrogen passage 13a and an air passage 15a on both sides of the membrane-electrode assembly 20. The hydrogen passage 13a is positioned at an anode electrode side of the membrane-electrode assembly 20 (described below) and the air passage 15a is located at a cathode electrode side of the membrane-electrode assembly 20.

Herein, the hydrogen passage 13a and the air passage 15a are each oriented orthogonally at any interval from each separator 13 and 15 and both ends thereof are alternately connected to each other to be formed in an approximate zigzag form. The structure of the hydrogen passage 13a and the air passage 15a is not limited thereto.

The membrane-electrode assembly 20 located between the separators 13 and 15 includes an active region 201 in which the reaction is generated and a non-active region 202 connected to the edge portion of the active region 201. In this configuration, the non-active region 202 may be provided with a gasket sealing the edge portions of the closing surface of the separators 13 and 15 corresponding to the active region 201.

Figure 3:
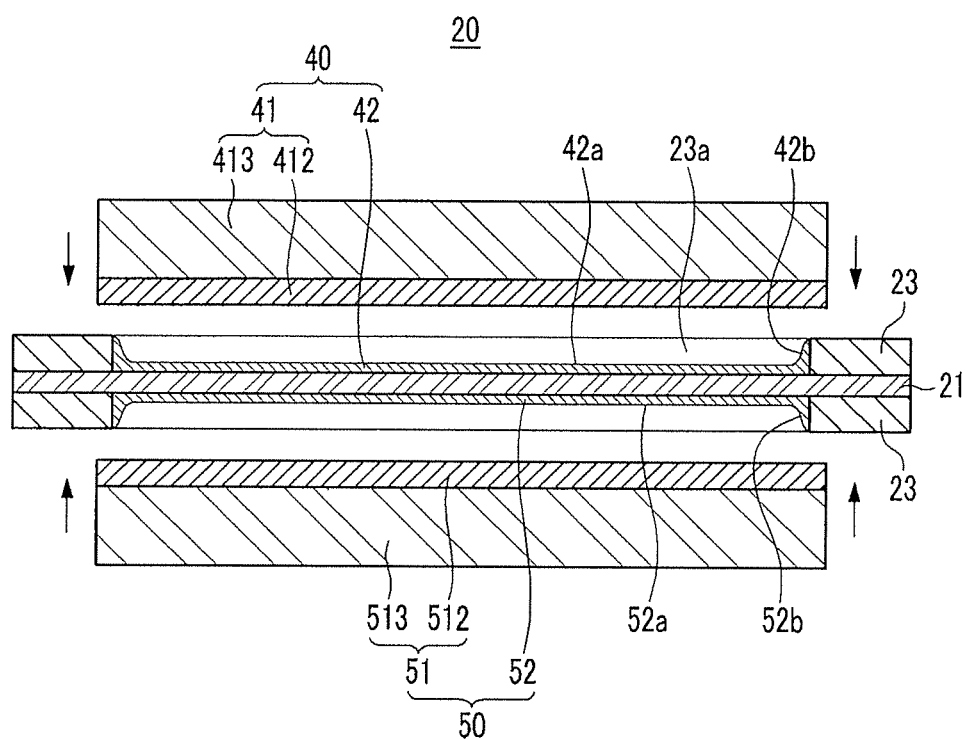
FIG. 3 is a cross-sectional view showing a membrane-electrode assembly according to the first exemplary embodiment of the present invention.
Figure 4:
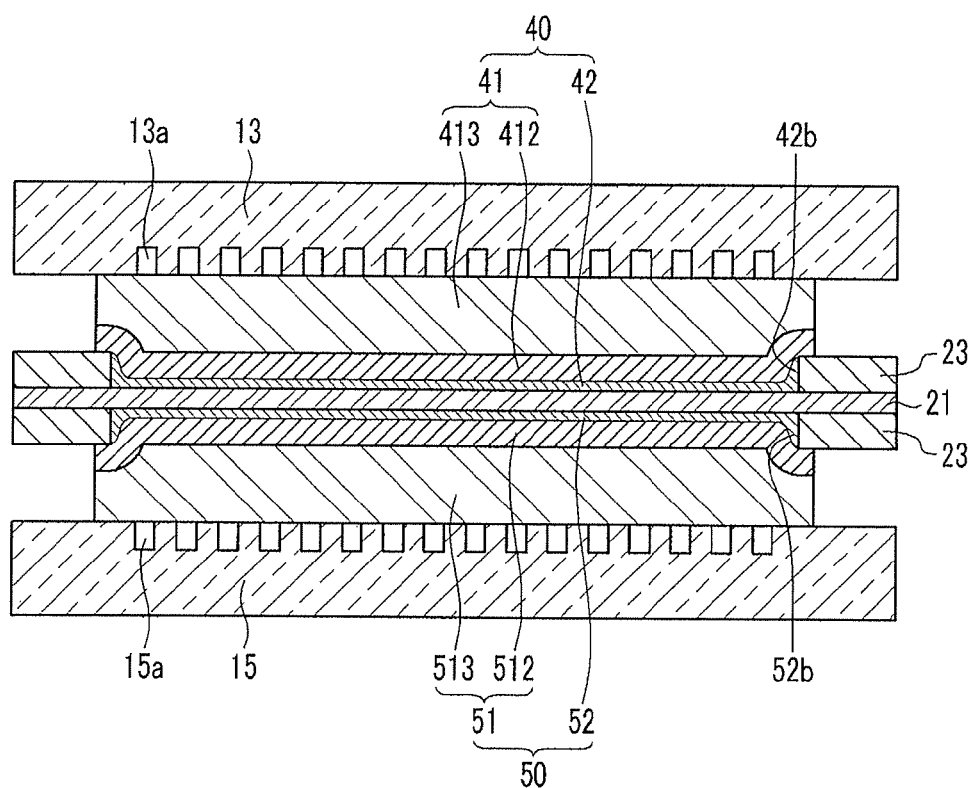
FIG. 4 is a cross-sectional view showing a unit cell according to the first exemplary embodiment of the present invention.

FIG. 3 is a cross-sectional view showing a membrane-electrode assembly according to the first exemplary embodiment of the present invention and FIG. 4 is a cross-sectional view showing a unit cell according to the first exemplary embodiment of the present invention.

Referring to FIGS. 3 and 4, the membrane-electrode assembly 20 includes an anode electrode 40 and a cathode electrode 50 located on opposing surfaces with the electrolyte membrane 21 therebetween.

The electrolyte membrane 21 is formed in the solid polymer electrolyte having a thickness of between about 15 μm and about 50 μm to perform ion exchange that moves protons generated from an anode catalytic layer 42 to a cathode catalytic layer 52.

The anode electrode 40 forming one surface of the membrane-electrode assembly 20 receives hydrogen gas through the hydrogen passage 13a formed on the separator 13 and the membrane-electrode assembly 20 and includes the anode catalytic layer 42 and anode gas diffusion layer 41. The anode gas diffusion layer 41 is configured to include an anode microporous layer (MPL) 412 formed on the anode catalytic layer 42 and an anode backing layer 413 formed on the anode MPL 412.

The anode MPL 412 may be made of graphite, carbon nanotube (CNT), fullerene ($C_{60}$), active carbon or carbon nano horn, or the like. The anode backing layer 413 may be made of a carbon paper or a carbon cloth and has a plurality of holes that are smaller than holes formed on the anode backing layer 413. The anode MPL 412 further disperses gas to transfer the gas to the anode catalytic layer 42.

The edge protective layers 23 are formed on both edges of the electrolyte membrane 21 in a quadrangular ring form by extending along the side end (edge) of the electrolyte membrane 21. Therefore, an opening 23a is formed on an interior side of the edge protective layer 23 and the anode catalytic layer 42 is inserted into the opening 23a. The anode catalytic layer 42 has a plate portion 42a closely attached to the electrolyte membrane 21 and a protruding portion 42b protruding from the side end of the plate portion 42a. The protruding portion protrudes toward the anode gas diffusion layer 41 from the upper surface of the plate portion and is closely attached to the inner side of the edge protective layer 23.

In one embodiment, the edge protective layer 23 is thicker than the anode catalytic layer 42 and in one embodiment, is thicker than the plate portion 42a of the anode catalytic layer. For example, the thickness of the edge protective layer 23 is between about 30 μm and about 100 μm and the thickness of the anode catalytic layer 42 is between about 5 μm and about 15 μm.

Therefore, the protruding portion 42b protruding from the side end of the plate 42a is inserted into the opening 23a to be closely attached to the inner side of the edge layer 23. When the protruding portion 42b is closely attached to the inner side of the edge protective layer 23, contact between the electrolyte membrane 21 and the cathode gas diffusion layer 41 can be prevented. When the protruding portion 42b is omitted, the cathode gas diffusion layer 41 may be exposed to the electrolyte membrane 21 between the cathode catalytic layer 42 and the edge protective layer 23, thereby promoting the deterioration of the electrolyte membrane 21. However, when the protrusion 42b is closely attached to an inner wall of the edge protective layer 23, the contact of the cathode gas diffusion layer 41 and the electrolyte membrane 21 is stably prevented, thereby making it possible to prevent the pin hole from being formed in the electrolyte membrane 21 due to the deterioration.

The cathode electrode 50 formed on the other surface of the membrane-electrode assembly 20 receives oxygen gas through the air passage 15a formed between the separator 15 and the membrane-electrode assembly 20 and includes the cathode catalytic layer 52 and the cathode gas diffusion layer 51. The cathode gas diffusion layer 51 is configured to include a cathode microporous layer 512 formed on the cathode catalytic layer 52 and a cathode backing layer 513 formed on the cathode microporous layer 512.

The cathode microporous layer 512 may be made of graphite, carbon nanotube (CNT), fullerene ($C_{60}$), activated carbon or carbon nano horn, or the like, and has a plurality of holes that are smaller than the holes formed on the cathode backing layer 513. Meanwhile, the cathode backing layer 513 may be made of carbon paper or carbon cloth and the inside thereof is provided with holes. The cathode microporous layer 512 further disperses gas to transfer the gas to the cathode catalytic layer 52.

The cathode catalytic layer 52 is inserted into the opening 23a formed in the edge protective layer 23 and has a plate portion 52a closely attached to the electrolyte membrane 21 and a protruding portion 52b protruding from the side end of the plate portion 52a. The protruding portion 52b protrudes toward the cathode gas diffusion layer 51 from the side end (edge) of the plate portion 52a to be closely attached to the inner surface of the edge protective layer 23.

The edge protective layer 23 is formed to be thicker than the cathode catalytic layer 52. For example, the thickness of the edge protective layer 23 is between about 30 μm and about 100 μm and the thickness of the cathode catalytic layer 52 is between about 5 μm and about 15 μm.

Therefore, the protruding portion 52b protruding from the side end of the plating portion 52a is inserted into the opening 23a such that it may be closely attached to the inner side of the edge protective layer 23. When the protruding portion 52b is closely attached to the inner side of the edge protective layer 23, contact between the electrolyte membrane 21 and the cathode gas diffusion layer 51 can be prevented. When the protruding portion 52b is omitted, the cathode gas diffusion layer 51 is exposed to the electrolyte membrane 21 between the cathode catalytic layer 52 and the edge protective layer 23, thereby making it possible to promote the deterioration in the electrolyte membrane 21. However, when the protruding portion 52b is closely attached to the inner wall of the edge protective layer 23, the contact of the cathode gas diffusion layer 51 and the electrolyte membrane 21 is stably prevented, thereby making it possible to prevent the pin hole from being formed in the electrolyte membrane 21 due to the deterioration.

In addition, the anode gas diffusion layer 41 and the cathode gas diffusion layer 51 are formed to be wider than the opening 23a to partially contact the outer surface of the edge protective layer 23. Therefore, the side ends of the anode gas diffusion layer 41 and the cathode gas diffusion layer 51 are not inserted into the opening 23a, but rather are positioned on the edge protective layer 23 and the anode gas diffusion layer 41 and the cathode gas diffusion layer 51 contact the outer surface of the edge protective layer 23. Therefore, contact with the electrolyte membrane 21 due to the dipping of the edge portions of side ends of the anode gas diffusion layer 41 and the cathode gas diffusion layer 51 in the catalytic layers 42 and 52 can be substantially prevented. The side ends of the anode gas diffusion layer 41 and the cathode gas diffusion layer 51 are positioned at an outer side by between about 0.2 mm and about 10 mm compared to the side end of the opening 23a. Therefore, the anode gas diffusion layer 41 and the cathode gas diffusion layer 51 contact the outer surface of the edge protective layer 23, having a width of between about 0.2 mm and about 10 mm.

FIGS. 5A to 5E are drawings for explaining a process of fabricating the membrane-electrode assembly according to the first exemplary embodiment of the present invention.

The method for fabricating a membrane-electrode assembly 20 according to the exemplary embodiment includes attaching the edge protective layer 23, forming the catalytic layers 42 and 52, and forming the gas diffusion layer 41 and 51.

Figure 5A:
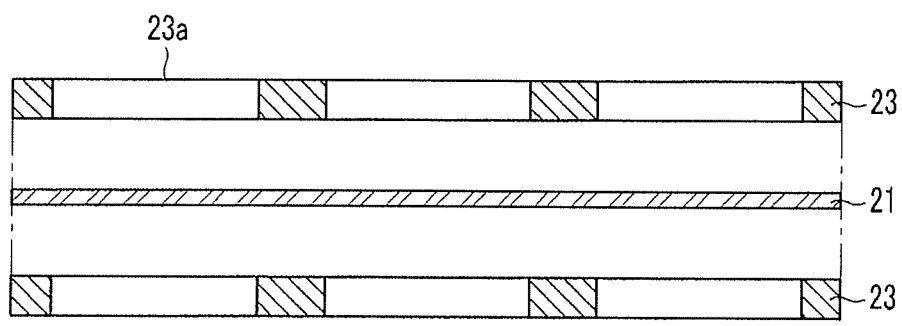
FIGS. 5A to 5E are drawings illustrating a process of fabricating the membrane-electrode assembly according to the first exemplary embodiment of the present invention.

As shown in FIG. 5A, the edge protective layer 23 is attached to both edges of the electrolyte membrane 21. The edge protective layer 23 is made of polymer, etc. and is formed of a structure where the plurality of openings are formed in the inside. The electrolyte membrane 21 may be formed to have a stripe shape extending in one direction and the edge protective layer 23 is formed with the plurality of openings and in a stripe shape extending in one direction.

The edge protective layers 23 may be attached on the electrolyte membrane at the same time in a roll to roll manner. The roll to roll manner is applied to the printing and involves attaching using a roller. According to the exemplary embodiment, a plurality of membrane-electrode assemblies 20 may be formed at one time.

Figure 5B:
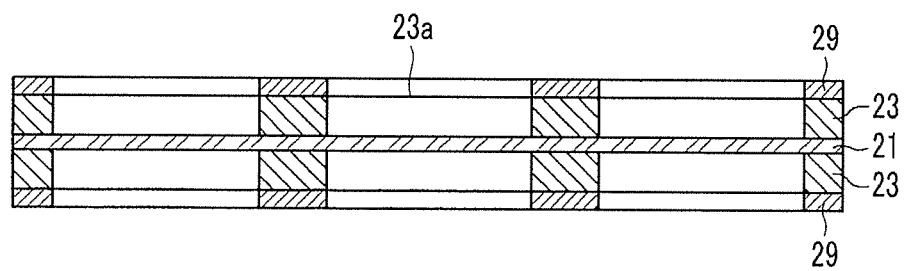
Figure 5C:
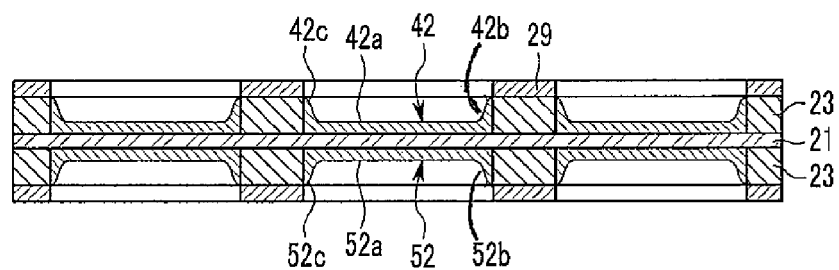

As shown in FIGS. 5B and 5C, forming the catalytic layers 42 and 52 includes attaching a masking film 29 and coating the catalytic layers 42 and 52. The masking film 29 is attached to the edge protective layer 23 and not to the opening 23a. Therefore, the masking film 29 is also provided with the plurality of holes generally corresponding to the opening 23a. The masking film 29 does not provide the catalytic layers 42 and 52 on the edge protective layer 23 and provides the catalytic layers 42 and 52 on only the inside of the opening 23a.

For coating the catalytic layers 42 and 52, the plate portions 42a and 52a are coated on the exposed electrolyte membrane 21 through the opening 23a at the same time, and the protruding portions 42b and 52b are coated on the inner wall of the edge protective layer 23.

The protruding portions 42b and 52b protrude toward the gas diffusion layers 41 and 51 (FIG. 5E) from the upper surface of the plate portions 42a and 52a and the height of the protruding portions 42b and 52b may be equal to or less than the height of the edge protective layer 23. The front ends of the protruding portion 42b and 52b are provided with the guide portions 42c and 52c tapering toward the edge protection layer 23 and the guide portions 42c and 52c serve to guide the microporous layers 412 and 512 into the catalytic layers 42 and 52 so that when the microporous layers 412 and 512 are inserted into the catalytic layers 42 and 52, the catalytic layers 42 and 52 are not easily separated from the inner side of the edge protective layer 23.

In addition, forming the catalytic layers 42 and 52 further includes drying the catalytic layers 42 and 52 and the removing the masking film 29. For drying the catalytic layers 42 and 52, the solvent, etc., is dried in the catalytic layers 42 and 52 in a slurry form and the masking film 29 is removed from the edge protective layer 23.

Figure 5D:
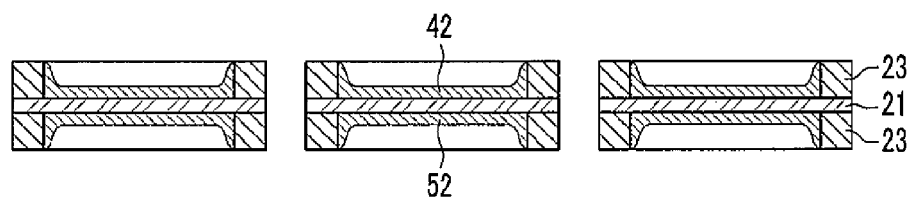
Figure 5E:
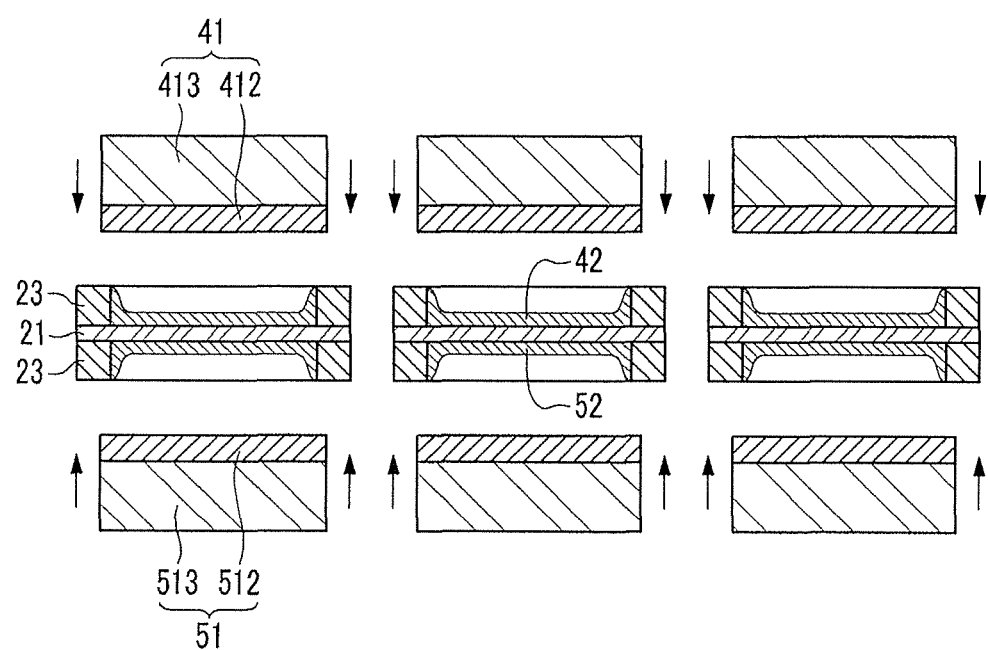

Meanwhile, as shown in FIG. 5D and FIG. 5E, forming the gas diffusion layer includes cutting and attaching the gas diffusion layer.

The edge protective layer 23 and the electrolyte membrane 21 are cut together at the portion where the edge protective layer 23 is installed to separate the plurality of membrane-electrode assemblies. For attaching the gas diffusion layer 41 and 51, the gas diffusion layers 41 and 51 including the microporous layers 412 and 512 and the backing layers 413 and 513 are attached to the catalytic layers 42 and 52.

Although the exemplary embodiment includes attaching the gas diffusion layers 41 and 51 after the cutting, the present invention is not limited thereto and the gas diffusion layers 41 and 51 may be cut after being attached.

FIGS. 6A to 6E illustrate a method of fabricating a membrane-electrode assembly according to a second exemplary embodiment of the present invention.

The method for fabricating the membrane-electrode assembly 80 according to the exemplary embodiment includes attaching the edge protective layer 82, forming the catalytic layers 85 and 87, and forming the gas diffusion layers 83 and 84.

Figure 6A:
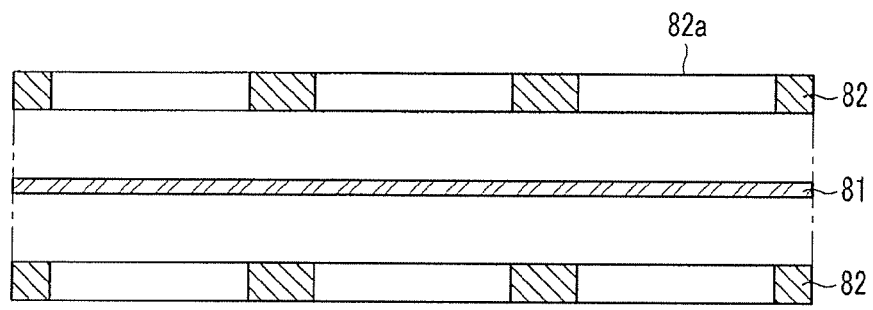
FIGS. 6A to 6E are drawings illustrating a method of fabricating a membrane-electrode assembly according to a second exemplary embodiment of the present invention.

As shown in FIG. 6A, attaching the edge protective layer 82 includes attaching the edge protective layer 82 to both sides of the electrolyte membrane 81. The edge protective layer 82 is made of polymer, etc. and has a structure in which the inside thereof is formed with the plurality of openings 82a.

The electrolyte membrane 81 is formed to have a stripe shape extending in one direction to form the plurality of membrane-electrode assemblies 80 and the edge protective layer 82 is provided with a plurality of openings and is formed to have a stripe shape extending in one direction.

The edge protective layer 82 may be attached to the electrolyte membrane 81 in a roll to roll method. As described above, according to the exemplary embodiment, a plurality of membrane-electrode assemblies 80 may be formed at the same time.

Figure 6B:
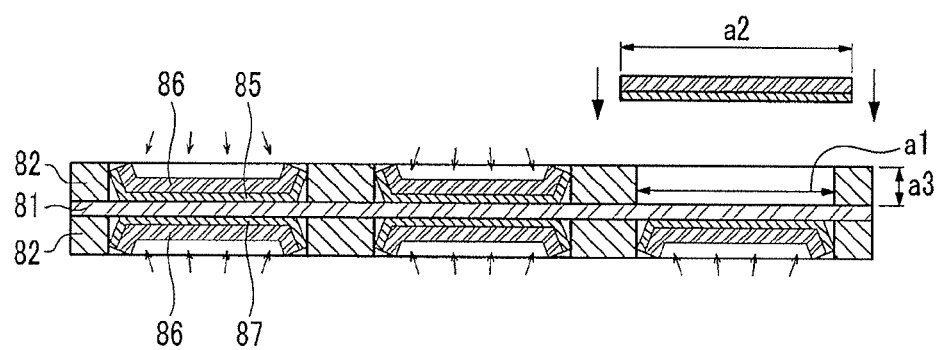
Figure 6C:
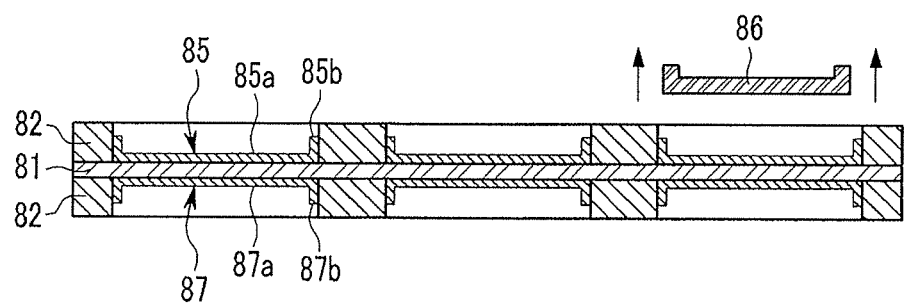

As shown in FIGS. 6B and 6C, forming the catalytic layers 85 and 87 includes inserting the catalytic layers 85 and 87, pressing the catalytic layer 85 and 87, and removing the insert film 86.

Inserting the catalytic layers 85 and 87 includes inserting the catalytic layers 85 and 87 attached to the insert film 86 into the opening 82a together with the insert film 86. In one embodiment, the width a2 of the catalytic layers 85 and 87 is formed to be greater than a width of the opening 82a and is formed to be less than a width of the sum of the widths of the opening 82a and the edge protective layer 82.

Pressing the catalytic layers 85 and 87 including pressing the catalytic layers 85 and 87 together with the insert film 86 to attach the catalytic layers 85 and 87 to the surface of the electrolyte membrane 81 and to the inner side of the edge protective layer 82. Since the width of the catalytic layers 85 and 87 is greater than the opening 82a, the edges of the catalytic layers 85 and 86 protrude farther than the other portions and are attached to the side of the edge protective layer 82. Therefore, the catalytic layers 85 and 87 are provided with plate portions 85a and 87a attached to the electrolyte membrane 81 and are provided with protruding portions 85b and 87b protruding from the plate portions 85a and 87a and attached to the sides of the edge protective layer 82. In addition, the width of the catalytic layers 85 and 87 is formed to be less than the sum of the areas of the opening 82a and the edge protective layer 82 and the height of the protruding portions 85b and 87b is formed to be lower that than of the edge protective layer 82.

Removing the insert film 86 includes separating and removing the insert film 86 from the catalytic layers 85 and 87 after the catalytic layers 85 and 87 are attached.

Figure 6D:
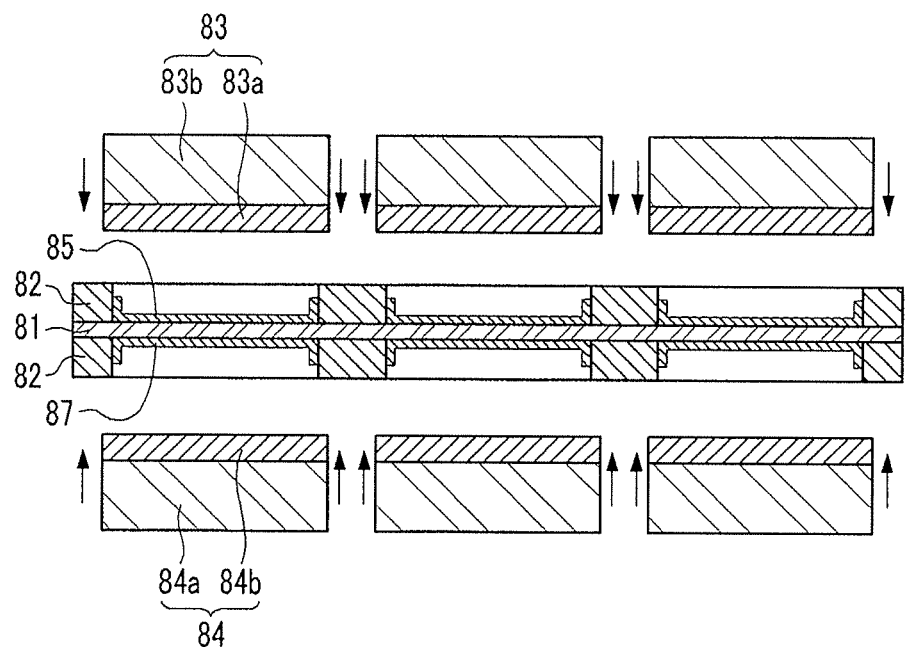
Figure 6E:
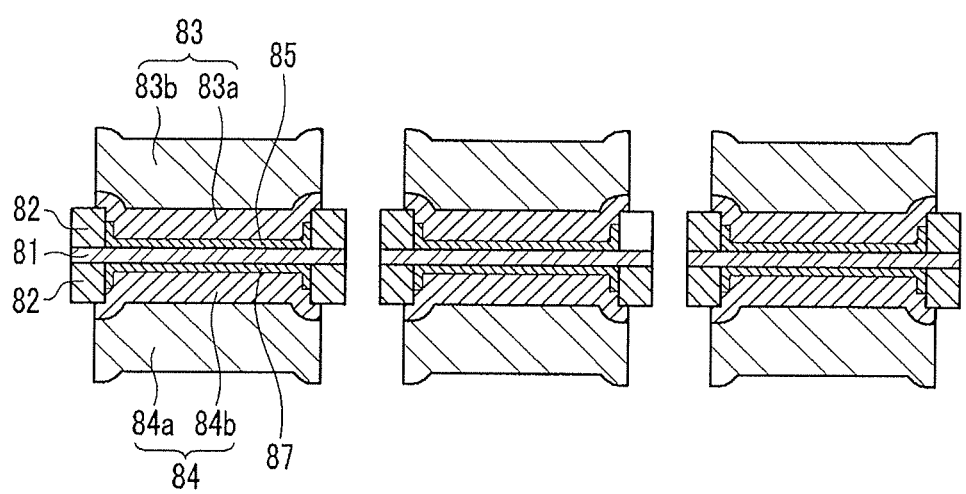

With reference to now to FIGS. 6D and 6E, forming the gas diffusion layers 83 and 84 includes attaching the gas diffusion layers 83 and 84 and cutting them.

Attaching the gas diffusion layers 83 and 84 includes attaching the gas diffusion layers 83 and 84 including the microporous layers 83a and 84a and the backing layers 83b and 84b on the catalytic layers 85 and 87. Cutting the gas diffusion layers 83 and 84 includes cutting the edge protective layer 82 and the electrolyte membrane 81 together at the portion where the edge protective layer 82 is installed to separate the plurality of membrane-electrode assemblies Although the exemplary embodiment includes cutting the gas diffusion layers 83 and 84 after attaching them, the present invention is not limited thereto and may include attaching the gas diffusion layers 83 and 84 after cutting them.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
| --- | --- |
| 100: Fuel cell stack | 10: Unit cell |
| 13, 15: Separator | 13a: Hydrogen passage |
| 15a: Air passage | 20, 80: Membrane-electrode assembly |
| 201: Active region | 202: Non-active region |
| 21, 81: Electrolyte membrane | 23, 82: Edge protective layer |
| 23a, 82a: Opening | 29: Masking film |
| 30: Press plate | 40: Anode |
| 41: Anode gas diffusion layer | 412: Anode microporous layer |
| 413: Anode backing layer | 42a, 52a, 85a, 87a: Plate portion |
| 42b, 52b, 85b, 87b: Protruding portion | 42c, 52c: Guide portion |
| 50: Cathode | 51: Cathode gas diffusion layer |
| 512: Cathode microporous layer | 513: Cathode backing layer |
| 52: Cathode catalytic layer | |

What is claimed is:

1. A membrane-electrode assembly for a fuel cell, the membrane-electrode assembly comprising:
an electrolyte membrane;
a first and second edge protective layers located generally at respective edges of the electrolyte membrane;
a catalytic layer extending in its entirety between the first and second edge protective layers, the catalytic layer comprising a plate portion contacting the electrolyte membrane and a protruding portion protruding towards a gas diffusion layer from side ends of an upper surface of the plate portion and coating an inner wall of the edge protective layers, wherein a height of the protruding portion is equal to or less than a height of the edge protective layers; and
the gas diffusion layer on the catalytic layer, the gas diffusion layer comprising a microporous layer directly contacting the catalytic layer and a backing layer on the microporous layer and spaced from the catalytic layer, wherein the backing layer has a planar surface configured to contact a separator.

2. The membrane-electrode assembly of claim 1, wherein the protruding portion extends along an edge of the plate portion.

3. The membrane-electrode assembly of claim 1, wherein a thickness of the catalytic layer is less than a thickness of the edge protective layer.

4. The membrane-electrode assembly of claim 1, wherein a thickness of the catalytic layer is between about 5 μm and about 15 μm.

5. The membrane-electrode assembly of claim 1, wherein a thickness of the edge protective layer is between about 30 μm and about 100 μm.

6. The membrane-electrode assembly of claim 1, wherein an opening is adjacent to the edge protective layer and wherein a width of the gas diffusion layer is greater than a width of the opening.

7. The membrane electrode assembly of claim 1, wherein an outer surface of the protruding portion extends away from the plate portion and wherein an end of the protruding portion tapers towards the edge protective layer for guiding the microporous layer onto the catalytic layer and for preventing separation of the catalytic layer from the edge protection layer.

8. A fuel cell stack comprising:
a plurality of unit cells each comprising a membrane-electrode assembly wherein the membrane-electrode assembly comprises:
an electrolyte membrane;
a first and second edge protective layers located generally at respective edges of the electrolyte membrane; and
a catalytic layer extending in its entirety between the first and second edge protective layers, the catalytic layer comprising a plate portion contacting the electrolyte membrane and a protruding portion protruding towards a gas diffusion layer from side ends of an upper surface of the plate portion and coating an inner wall of the edge protective layers, wherein a height of the protruding portion is equal to or less than a height of the edge protective layers;
the gas diffusion layer on the catalytic layer, the gas diffusion layer comprising a microporous layer directly contacting the catalytic layer and a backing layer on the microporous layer and spaced from the catalytic layer;
a pair of separators, one of the pair of separators on respective opposing sides of the membrane-electrode assembly and contacting the backing layer, wherein a surface of each of the separators that contacts the backing layer has a constant thickness; and
a pair of pressing plates, one of the pair of pressing plates on respective opposing ends of the unit cells.

9. The fuel cell stack of claim 8, wherein the protruding portion extends generally along an edge of the plate portion.

10. The fuel stack of claim 8, wherein a thickness of the catalytic layer is less than a thickness of the edge protective layer.

11. The fuel cell stack of claim 8, wherein an opening is adjacent to the edge protective layer, and wherein the gas diffusion layer is wider than the opening so that a portion of the gas diffusion layer is on the edge protective layer.

12. The fuel cell stack of claim 11, wherein the portion of the gas diffusion layer on the edge protective layer has a length between about 0.2 mm and about 10 mm.

13. The fuel cell stack of claim 8, wherein an opening is adjacent to the edge protective layer, and wherein a width of the catalytic layer is greater than a width of the opening.

14. The fuel cell stack of claim 8, wherein an outer surface of the protruding portion extends away from the plate portion and wherein an end of the protruding portion tapers towards the edge protective layer for guiding the microporous layer onto the catalytic layer and for preventing separation of the catalytic layer from the edge protection layer.

* * * * *